United States Patent
Carter et al.

[11] Patent Number: 5,971,556
[45] Date of Patent: Oct. 26, 1999

[54] INSTRUMENT PANEL HAVING COVER WITH REFLECTION-REDUCTION LAYER AND METHOD OF MAKING COVER

[75] Inventors: James C. Carter, Clarkston; Richard Megregian, Farmington Hills; Eli Nichols, Plymouth, all of Mich.

[73] Assignee: Chrysler Corporation, Auburn Hills, Mich.

[21] Appl. No.: 08/936,653

[22] Filed: Sep. 24, 1997

[51] Int. Cl.[6] .................................................. G01D 11/28
[52] U.S. Cl. ................................ 362/23; 362/29; 362/30; 359/360
[58] Field of Search ............................. 359/360; 362/23, 362/29, 30, 307, 329

[56] References Cited

U.S. PATENT DOCUMENTS

| | | | |
|---|---|---|---|
| 2,478,817 | 8/1949 | Gaiser | 359/488 |
| 2,851,731 | 9/1958 | Gits et al. | 264/339 |
| 3,017,713 | 1/1962 | Butler | 40/615 |
| 3,202,070 | 8/1965 | Pratt et al. | 362/293 |
| 3,364,049 | 1/1968 | Deak et al. | 40/615 |
| 3,451,876 | 6/1969 | Edelmann et al. | 428/163 |
| 3,516,720 | 6/1970 | Mauer | 359/360 |
| 3,578,538 | 5/1971 | Prosser et al. | 428/134 |
| 3,652,318 | 3/1972 | Heins | 427/167 |
| 3,696,715 | 10/1972 | Jedilicka | 362/293 |
| 3,748,025 | 7/1973 | Van Putten, Jr. | 359/608 |
| 3,853,675 | 12/1974 | Edwards | 428/77 |
| 3,907,403 | 9/1975 | Maeda | 385/120 |
| 4,013,465 | 3/1977 | Clapham et al. | 96/36 |
| 4,082,426 | 4/1978 | Brown | 359/540 |
| 4,099,838 | 7/1978 | Cook et al. | 359/537 |
| 4,114,983 | 9/1978 | Maffitt et al. | 359/580 |
| 4,190,321 | 2/1980 | Dorer et al. | 359/581 |
| 4,246,713 | 1/1981 | Eckert | 40/437 |
| 4,264,140 | 4/1981 | Harrison et al. | 359/601 |
| 4,337,590 | 7/1982 | Jackson | 40/615 |
| 4,417,411 | 11/1983 | Miyagishima et al. | 40/443 |
| 4,480,894 | 11/1984 | Miller et al. | 359/628 |
| 4,544,586 | 10/1985 | Molari, Jr. | 428/29 |
| 4,663,869 | 5/1987 | Nakagawa | 40/219 |
| 4,772,096 | 9/1988 | Kai et al. | 359/601 |
| 4,877,308 | 10/1989 | Okuno et al. | 359/601 |
| 4,933,218 | 6/1990 | Longobardi | 428/38 |
| 4,975,807 | 12/1990 | Ohashi | 362/23 |
| 4,980,803 | 12/1990 | Richmond et al. | 362/23 |
| 5,098,170 | 3/1992 | Turner | 359/68 |
| 5,115,379 | 5/1992 | Nagai | 362/23 |
| 5,142,415 | 8/1992 | Koehnle | 359/601 |
| 5,184,881 | 2/1993 | Karpen | 362/1 |
| 5,421,939 | 6/1995 | Scher et al. | 156/235 |
| 5,422,756 | 6/1995 | Weber | 359/487 |
| 5,443,869 | 8/1995 | Harris | 428/13 |
| 5,821,867 | 10/1998 | Angell et al. | 362/29 |

*Primary Examiner*—Cassandra Spyrou
*Assistant Examiner*—E. Cherry
*Attorney, Agent, or Firm*—Jennifer M. Stec

[57] ABSTRACT

An instrument panel having a light source and a transparent cover in front of the light source. The transparent cover has a first surface at the front side of the cover and a second surface at the back side of the cover, and is formed of a polymeric wall and a polymeric film. The polymeric film has a reflection-reduction layer thereon and is bonded by intermolecular forces to the wall so that the polymeric film is on at least one of the first and second surfaces of the cover and the reflection-reduction layer is sandwiched between the film and the wall. The reflection-reduction layer is formed of a material selected from the group consisting of (a) oxides of magnesium, zinc, or aluminum, or alloys thereof, (b) hydroxides of magnesium, zinc, or aluminum, or alloys thereof, and (c) semi-metals and metals which are non-alkali metals and non-alkaline earth metals, alloys thereof, and combinations thereof. The method for making a transparent cover includes (a) applying a reflection-reduction layer onto a polymeric film, (b) placing the polymeric film with the reflection-reduction layer thereon on at least one inside surface of a mold so that the reflection-reduction layer is exposed; (c) filling the mold with a moldable polymer; and (d) allowing the moldable polymer to harden so that a transparent cover having an inmolded reflection-reduction layer is formed.

5 Claims, 2 Drawing Sheets

INSTRUMENT PANEL HAVING COVER WITH REFLECTION-REDUCTION LAYER AND METHOD OF MAKING COVER

BACKGROUND OF THE INVENTION

1. Field of the Invention

The present invention relates generally to instrument panels and methods of making their covers and, more particularly, to instrument panels having reduced amounts of reflections therefrom and methods of making their covers.

2. Description of the Related Art

Illuminating instrument panels for automobiles, usually placed in the dash of the automobile, show the status of various operations of the automobile. A typical illuminating instrument panel has a front side for positioning toward the viewer, a back side for positioning away from the viewer, a light source at the back side of the panel for illuminating the panel, an overlay in front of the light source which allows some light to pass through and illuminate the panel, and a transparent cover in front of and spaced away from the overlay. Most often an illuminating instrument panel includes a movable dial or indicator in front of the overlay and corresponding graphics printed on the overlay. Such instrument panels include speedometers, gas gauges, engine temperature gauges, and tachometers.

In addition to the above, the typical illuminating instrument panel includes a light-impervious brow extending over the front of the transparent cover for reducing the amount of reflections from the instrument panel directed toward the viewer. For example, ambient light (e.g., from the sun), hits the brow and is absorbed rather than hitting the transparent cover and reflecting back into the viewer's eyes, impairing the viewer's vision.

The light-impervious brow is also present to reduce the amount of reflectance caused by light-colored objects inside the passenger compartment of the automobile. For example, when the viewer wears light-colored clothing, light from the clothing is reflected by the transparent cover. This occurrence is often referred to as the "white shirt syndrome". The cover of the instrument panel is typically designed so that much of the reflection from the clothing is projected toward the brow and not seen by the viewer.

Brows, however, are cumbersome in design, require a substantial amount of material to construct and add weight to the automobile. It would be desirable to control the instrument panel reflections without a brow to provide more automobile design flexibility (both functionally and aesthetically) and to save on material cost and weight of the automobile.

Another problem with current instrument panels is the reduction in clarity of the graphics due to any reflections on the transparent cover's surfaces. When illuminated, the light source in the instrument panel gauge improves the clarity of the graphics, however a loss in graphics clarity is experienced when the panel is not illuminated, which is often the case during the day. For example, when the cover is clear (or 100% transmitting), around 8% of normal daylight reflects back to the viewer (about 4% from the front surface of the instrument panel cover and about 4% from the back surface of the instrument panel cover). This leaves only about 92% of the normal daylight passing through to the overlay.

If the overlay is reflective, then some of the light striking the overlay is reflected back to the viewer with another approximate 8% loss of light through the cover again. In summary, a reduced level of original light finally reaches the viewer to provide an image of the graphics. The loss of light results in diminished clarity of the graphics to the viewer. If the reflections from the transparent cover's surfaces could be reduced, greater clarity of the graphics is achieved.

Another source of reflections is caused by finger prints or other soiling marks on the cover of the instrument panel. It is, therefore, desirable, to have an instrument panel on which soiling marks are easily removed.

It is, therefore, one object of the present invention to provide an illuminating instrument panel which has a reduced level of reflections on the cover and methods for making a cover for such instrument panels.

It is another object of the present invention to provide an illuminating instrument panel which presents more design flexibility than previous illuminating instrument panels.

It is yet another object of the present invention to provide an illuminating instrument panel which does not require a brow.

It is still another object of the present invention to provide an illuminating instrument panel which has improved graphics clarity for the viewer relative to previous illuminating instrument panels and methods for making the covers which have improved graphics clarity.

It is a further object of the present invention to provide an illuminating instrument panel which has a cover on which soiling marks are easily removed and a method for making such a cover.

It is yet a further object of the present invention to provide a fast and cost-effective method for making an instrument panel cover with reflection-reduction properties.

SUMMARY OF THE INVENTION

To achieve the foregoing objects, one embodiment of the present invention is an illuminating instrument panel having a front side for positioning toward a viewer and a back side for positioning away from the viewer, a light source, and a transparent cover in front of the light source. The transparent cover has a first surface at the front side of the cover and a second surface at the back side of the cover, and is formed of a polymeric wall and a polymeric film. The polymeric film has a reflection-reduction layer thereon and is bonded by intermolecular forces to the wall so that the polymeric film is on at least one of the first and second surfaces of the cover and the reflection-reduction layer is sandwiched between the film and the wall. The reflection-reduction layer is formed of a material selected from the group consisting of (a) oxides of magnesium, zinc, or aluminum, or alloys thereof, (b) hydroxides of magnesium, zinc, or aluminum, or alloys thereof, and (c) semi-metals and metals which are non-alkali metals and non-alkaline earth metals, alloys thereof, and combinations thereof. The reflection-reduction layer preferably ranges in thickness from about 10 to about 18 millimicrons.

Another embodiment of the present invention is a method for making a transparent cover for an illuminated instrument panel. The method includes (a) applying a reflection-reduction layer onto a polymeric film, (b) placing the polymeric film with the reflectionreduction layer thereon on at least one inside surface of a mold so that the reflection-reduction layer is exposed; (c) filling the mold with a moldable polymer; and (d) allowing the moldable polymer to harden so that a transparent cover having an inmolded reflection-reduction layer is formed. The reflection-reduction layer is formed of a material selected from the group consisting of (a) oxides of magnesium, zinc, or aluminum, or alloys thereof, (b) hydroxides of magnesium, zinc, or aluminum, or alloys thereof, and (c) semi-metals and metals which are non-alkali metals and non-alkaline earth metals, alloys thereof, and combinations thereof. Preferably, the reflection-reduction layer is applied to a thickness of from about 10 to about 18 millimicrons by a technique selected from the group consisting of vapor deposition, cathodic sputtering, electrolysis, and chemical methods.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
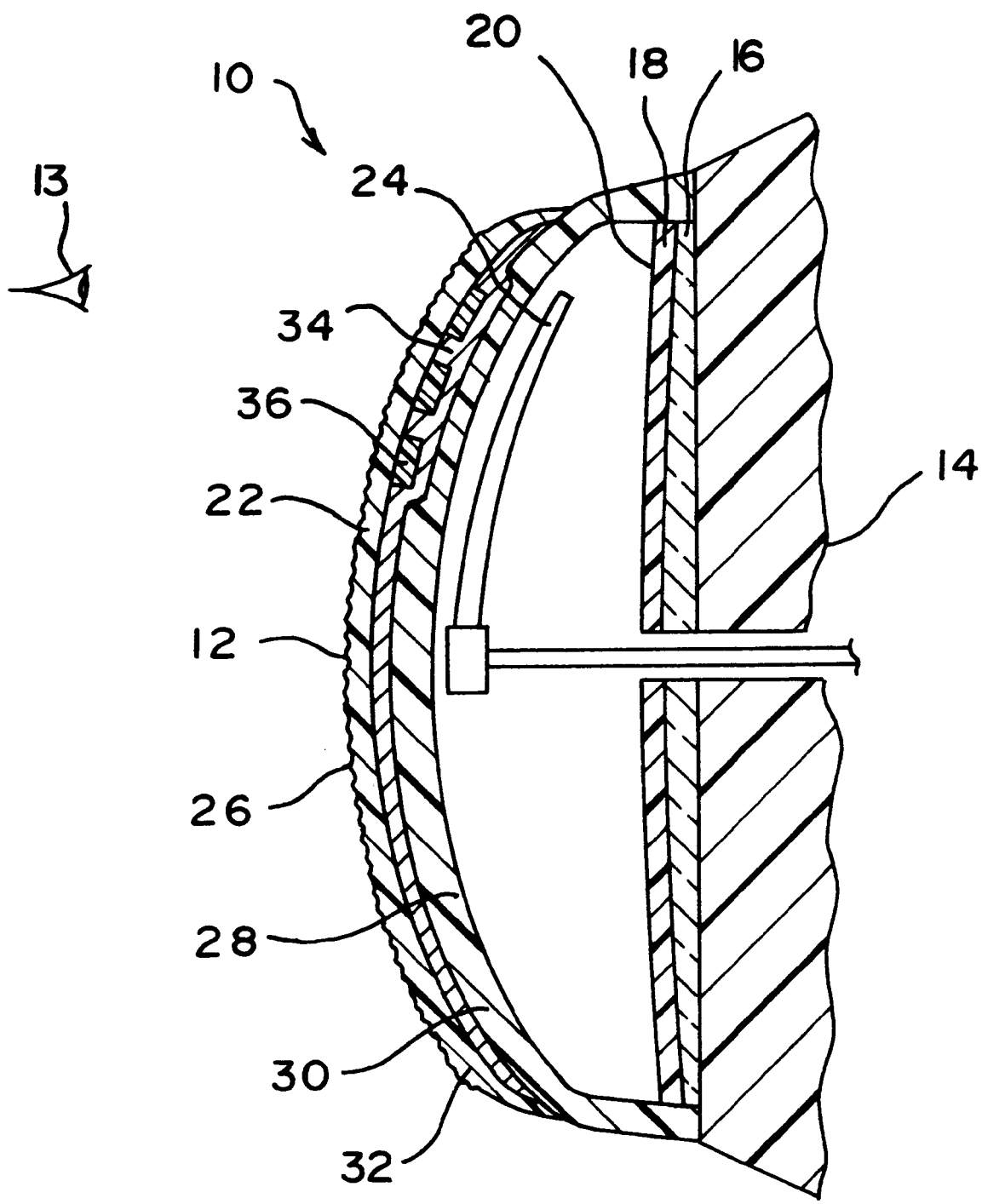
FIG. 1 is a side cross-sectional view of an instrument panel according to the present invention.

Referring to FIG. 1, illuminating instrument panel 10 is shown having front side 12 for positioning toward the viewer (represented by eye 13), back side 14 for positioning away from the viewer, light source 16 near back side 14, overlay 18 in front of light source 16, subdial surface 20 being the front surface of overlay 18, transparent cover 22 in front of and spaced away from light source 16, and movable dial 24 between subdial surface 20 and cover 22.

Cover 22 has first surface 26 facing the front side of instrument panel 10 and second surface 28 facing the back side of instrument panel 10. Cover 22 includes polymeric wall 30, polymeric film 32, and reflection-reduction layer 34. Graphics 36, which corresponds to movable dial 24, are between polymeric film 32 and reflection-reduction layer 34. Reflection-reduction layer 34 is present in cover 22 to reduce the amount of reflection from cover 22 toward viewer 13. Although polymeric film 32 is shown on first surface 26 of cover 22, film 32 may be alternatively or additionally on second surface 28, so long as reflection-reduction layer 34 is sandwiched between film 32 and wall 30.

Having the graphics on or in cover 22 rather than on subdial surface 20 improves the clarity of the graphics to the viewer since it alleviates the loss of transmittance of light due to reflection from the surfaces of cover 22. In addition, the texturing of first surface 26 would tend to blur the graphics more if the graphics were on subdial surface 20 rather than on or in cover 22.

First surface 26 of cover 22 is shown to be textured. The texturing of the cover helps to disperse any reflected light so that sun light or light clothing is not reflected directly back to the viewer but is dispersed in many directions. The texturing of the cover should be random to inhibit any new reflected pattern from being created by the texture. Textures generally consist of peaks and valleys, and the distance between peaks should be less than the wavelength of visible light so that light is caused to scatter in many directions.

Alternatively, or in addition thereto, second surface 28 of cover 22 may be textured.

Polymeric wall 30 is typically formed of transparent clear plastic, such as acrylic resin. Polymeric film 32 is preferably formed of a transparent plastic which is compatible with the plastic forming polymeric wall 30 so that good bonding between polymeric wall 30 and polymeric film 32 is achieved. Preferably, polymeric film 32 if formed of the same plastic as wall 30. Polymeric film 32 preferably has a thickness of from about 0.002 to about 0.015 inches and, more preferably, from about 0.003 to about 0.010 inches. The film must have sufficient integrity to be easily handled.

Reflection-reduction layer 34 is formed of a material having non-selective light-absorption properties, yet is formed so that light is still transmitted therethrough so that movable dial and any graphics that may be behind layer 34 may be seen. To such an end, oxides of magnesium, zinc, aluminum, or alloys thereof, hydroxides of magnesium, zinc, aluminum or alloys thereof, non-alkali and non-alkaline earth metals, semi-metals, alloys thereof, and combinations thereof are useful for forming layer 34.

The layers formed of oxides and hydroxides are disclosed in U.S. Pat. No. 4,190,321, which patent is incorporated herein by reference.

The layers formed of non-alkali and non-alkaline earth metals, semi-metals, alloys thereof, and combinations thereof are disclosed in U.S. Pat. No. 3,516,720, which patent is incorporated herein by reference. The non-alkali and non-alkaline earth metals include nickel, iron, chromium, titanium, aluminum, lanthanum, indium, tin, lead, tantalum, tungsten, cobalt, molybdenum, osmium, iridium, platinum, yttrium, zirconium, niobium, zinc, cadmium, vanadium, hafnium, rhenium, and thallium. The semi-metals (i.e., elements which possess metallic and non-metallic properties) include silicon, germanium, arsenic, antimony, and tellurium. As mentioned, alloys of the metals and/or semi-metals are useful for forming reflection-reduction layer 34. Combinations of any of the metals, semi-metals, or alloys of the metals or semi-metals are also useful for forming layer 34. Titanium, iron, chromium, nickel, and alloys of nickel, such as nickel-based "INCONEL" are some of the preferred materials for forming layer 34.

To maintain the light-transmittancy of layer 34, the thickness of reflection-reduction layer 34 should be kept to an effective minimum. Thicknesses of from about 5 to about 150 millimicrons provide satisfactory results, while thicknesses of from about 10 to about 18 millimicrons are preferred.

Having reflection-reduction layer 34 sandwiched between film 32 and wall 30 eliminates the occurrence of fingerprints, other soiling marks, scratching, abrasion, etc., from occurring on reflection-reduction layer 34 which commonly occurs when such a reflection-reduction layer is exposed to the environment.

Light source 16 may be any conventional light source, such as an incandescent lamp, a fluorescent lamp, a vacuum fluorescent lamp, an electroluminescent lamp, light emitting diodes, and liquid crystal displays. Incandescent lamps are the preferred and most-commonly used light source.

Overlay 18 of instrument panel 10 hides light source 16 from the viewer yet allows light from light source 16 to illuminate the instrument panel. Overlay 18 may be translucent in that light may pass through it or it may be designed so that light passes around at least a portion of the periphery of the overlay or only through open or cut-away sections in the overlay. The overlay may optionally include cut-away sections to allow meters, such as an odometer, to be seen by the viewer.

The overlay may be a film or coating, such as paint or a metallic coating, placed on the light source or it may be sheeting placed in front of the light source, such as colored plastic sheeting. The overlay is commonly formed of "MYLAR", a polyethylene terephthalate, available from E.I. du Pont de Nemours & Co., Inc., Wilmington, Del.

The movable dial of an instrument panel of the present invention is typically pivoting and controlled by the electronic system of the automobile. The movable dial itself may also be illuminating.

Cover 22 may be prepared by applying a reflection-reduction layer onto a polymeric film, placing the polymeric film with the reflection-reduction layer thereon on at least one inside surface of a mold so that the reflection-reduction layer is exposed; filling the mold with a moldable polymer; and allowing the moldable polymer to harden so that a transparent cover having an inmolded reflection-reduction layer is formed.

Figure 2:
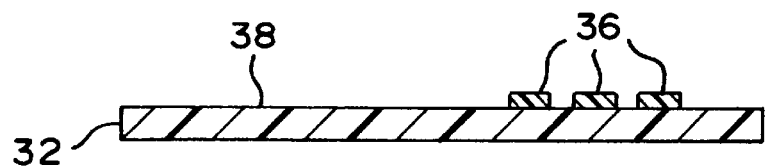
FIGS. 2–5 illustrate the results of the various steps of the method of the present invention.

The steps of this method for making cover 22 are depicted in FIGS. 2–5, which do not necessarily show the various elements to scale but is for illustration only. FIG. 2 shows graphics 36 on upper surface 38 of polymeric film 32. Although not shown, polymeric film 32 may optionally be pre-shaped to the same shape it will have on cover 22, if desired. Although it is optional to have graphics 36 directly on film 32, it is the preferred location for the graphics. Graphics 36 may be applied to polymeric film 32 in any of many conventional techniques. For example, graphics 36 may be applied by tampo-print methods, hot-stamping methods, or screen printing methods.

Figure 3:
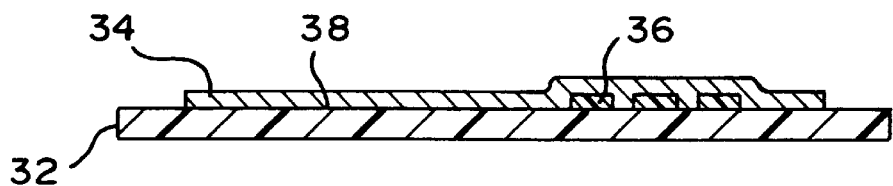

Reflection-reduction layer 34 is then deposited onto upper surface 38 of film 32 as shown in FIG. 3. When graphics 36 are on film 32 as shown, reflection-reduction layer 34 is also deposited onto the graphics. As mentioned above, reflection-reduction layer 34 may be formed of (a) oxides of magnesium, zinc, or aluminum, or alloys thereof, (b) hydroxides of magnesium, zinc, or aluminum, or alloys thereof, or (c) semi-metals and metals which are non-alkali metals and non-alkaline earth metals, alloys thereof, and combinations thereof.

The deposition of reflection-reduction layer 34 may be accomplished, e.g., by vapor deposition by evaporation and condensation, cathodic sputtering, electrolysis, or by a chemical method. Reflection-reduction layer 34 is preferably vapor deposited onto film 32 at vaporizing temperatures of from about 1000 to about 1400° C. under vacuum. Typical operating pressures for vapor deposition are from about 1.0 to about $3.0 \times 10^{-5}$ torr.

When the reflection-reduction layer 34 is of the type described in aforementioned U.S. Pat. No. 4,190,321, a thin film of a metal, such as aluminum, magnesium, zinc, or alloys thereof, is first deposited onto film 32. Thereafter, the metal film is then converted to an oxide or hydroxide coating by a chemical or chemical/electrochemical method as described in the '321 patent.

When reflection-reduction layer 34 is of the type described in U.S. Pat. No. 3,516,720, the metal, semi-metal, alloy, or combination is merely deposited onto film 32.

To maintain the light-transmittancy of layer 34, the thickness of layer 34 should be kept to an effective minimum. Thicknesses of from about 5 to about 150 millimicrons provide satisfactory results, while thicknesses of from about 10 to about 18 millimicrons are preferred.

Up to this point in the exemplary method, reflection-reduction coated polymeric film 32 may be formed as a long sheet in which the method of applying the graphics and the reflection-reduction layer may be performed on a continuous basis. Thereafter, film 32 required for each cover 22 may be cut from the long sheet. The continuous method is advantageous in that it provides a fast and cost-effective method of forming film 32.

Figure 4:
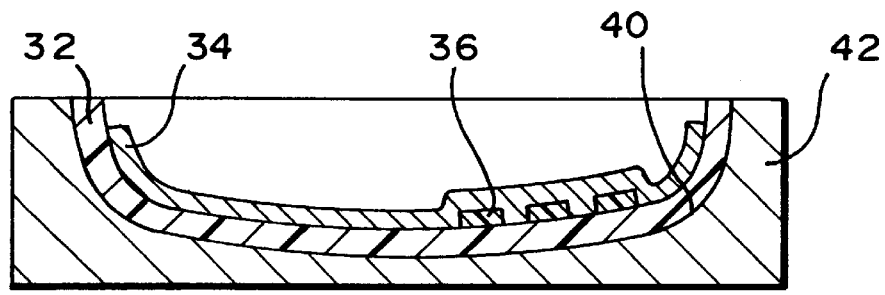

FIG. 4 shows the next step of a preferred method for making cover 22, which is placing the reflection-reduction coated film 32 onto an inside surface 40 of mold piece 42 so that film 32 is flush against inside surface 40 and reflection-reduction layer 34 is exposed. Film 32 is easily held in place by giving film 32 a high charge of static electricity before placing it in the mold, which method is well-known in the art of molding. Optionally, inside surface 40 of mold piece 42 may be textured to create a textured surface on film 32 during the molding process or film 32 may be pretextured on the surface opposite layer 34 prior to molding.

Figure 5:
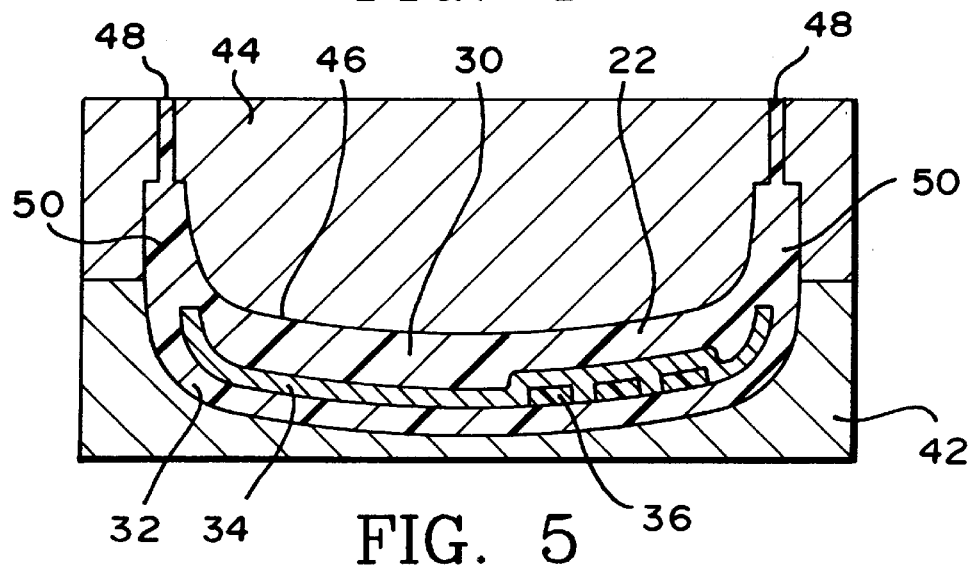

Mold piece 44 is then placed on top of mold piece 42 as shown in FIG. 5 completing cavity 46. Cavity 46 is then filled with polymer through gates 48 to form polymeric wall 30. A suitable molding technique for this method is injection molding.

When polymeric film 32 is formed of a polymer which is not compatible with the polymer of polymeric wall 30, a heat-sensitive, optically clear adhesive may be applied to the upper surface of reflection-reduction coated polymeric film 32, which would provide adhesion between polymeric wall 30 and polymeric film 32.

The polymer of polymeric wall 30 is then allowed to harden thus forming cover 22. At ends 50 of cover 22, wall 30 is shown directly contacting film 32 which reduces the chance of delamination of film 32 from wall 30 from occurring. In addition, it is preferred that reflection-reduction layer 34 is thin enough so that the polymers of polymeric wall 30 and polymeric film 32 have intimate molecular contact and bond together by intermolecular forces (also called van der Waals forces). Polymeric wall 30 and polymeric film 32 are therefore substantially non-peelable from each other.

Upon cooling of polymeric wall 34, cover 22 is then removed from the mold pieces and any extraneous pieces of polymer, such as those shown at gates 48 may be removed from cover 22. As mentioned, polymeric film 32 may be textured before molding. Alternatively or in addition, a surface of cover 22 may be textured during molding by having the texturing on the mold's interior or a surface of cover 22 may be textured after molding by, e.g., scotch brushing, grain-finishing methods, or by the method described in U.S. Pat. No. 4,114,983, which patent is incorporated herein by reference.

Accordingly, the present invention provides an illuminating instrument panel which has a reduced level of reflections on the cover, presents more design flexibility than previous illuminating instrument panels, does not require a brow, has improved graphics clarity for the viewer relative to previous illuminating instrument panels, and has a cover on which soiling marks are easily removed. The present invention also provides a fast and cost-effective method for making an instrument panel cover with reflection-reduction properties.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An illuminating instrument panel having a front side for positioning toward a viewer and a back side for positioning away from the viewer, the instrument panel comprising:
   a light source; and
   a transparent cover in front of the light source formed of a polymeric film and a polymeric wall, said polymeric film having a textured first surface defining a front surface of the transparent cover and a second surface having a reflection-reduction layer thereon, said polymeric wall having a first surface disposed against said reflection-reduction layer and a second surface defining a back surface of the transparent cover, said reflection-reduction layer being sandwiched directly between said polymeric film and said polymeric wall, said polymeric film being bonded to said polymeric wall by intermolecular forces, the reflection-reduction layer formed of a material selected from the group consisting of (a) oxides of magnesium, zinc, or aluminum, or alloys thereof, (b) hydroxides of magnesium, zinc, or aluminum, or alloys thereof, and (c) semi-metals and metals which are non-alkali metals and non-alkaline earth metals, alloys thereof, and combinations thereof.

2. The illuminating instrument panel of claim 1, wherein the reflection-reduction layer is formed of a material selected from the group consisting of nickel, iron, chromium, titanium, aluminum, lanthanum, indium, tin, lead, tantalum, tungsten, cobalt, molybdenum, osmium, iridium, platinum, yttrium, zirconium, niobium, zinc, cadmium, vanadium, hafnium, rhenium, thallium, silicon, germanium, arsenic, antimony, tellurium, and alloys thereof, and combinations thereof.

3. The illuminating instrument panel of claim 1, wherein the reflection-reduction layer is formed of a material selected from the group consisting of nickel, iron, chromium, titanium, and alloys of nickel.

4. The illuminating instrument panel of claim 1, wherein the reflection-reduction layer ranges in thickness from about 5 to about 150 millimicrons.

5. The illuminating instrument panel of claim 1, wherein the reflection-reduction layer ranges in thickness from about 10 to about 18 millimicrons.

* * * * *